United States Patent [19]

Itoh et al.

[11] Patent Number: 4,604,659
[45] Date of Patent: Aug. 5, 1986

[54] APPARATUS FOR DETECTING A DROP-OUT IN A MAGNETIC RECORDING/REPRODUCING APPARATUS

[75] Inventors: Shigeyuki Itoh, Ibaraki; Yoshizumi Watatani; Katsuo Mohri, both of Kanagawa, all of Japan

[73] Assignee: Hitachi, Ltd., Tokyo, Japan

[21] Appl. No.: 660,520

[22] Filed: Oct. 12, 1984

[30] Foreign Application Priority Data

Oct. 19, 1983 [JP] Japan ................................. 58-194297

[51] Int. Cl.$^4$ ......................... G11B 20/06; H04N 5/78
[52] U.S. Cl. ..................................... 360/38.1; 360/30
[58] Field of Search ....................... 360/19.1, 38.1, 31, 360/30

[56] References Cited

U.S. PATENT DOCUMENTS

| | | | |
|---|---|---|---|
| 4,353,093 | 10/1982 | Durbin, Jr. et al. | 360/38.1 |
| 4,403,262 | 9/1983 | Ito et al. | 360/30 |
| 4,499,570 | 2/1985 | Immink et al. | 360/38.1 |

*Primary Examiner*—Vincent P. Canney
*Attorney, Agent, or Firm*—Antonelli, Terry & Wands

[57] ABSTRACT

An apparatus for detecting and compensating for the drop-out in a video tape recorder in which an FM audio signal is recorded on a magnetic tape and is reproduced therefrom utilizing a rotary magnetic head. In a playback mode, a frequency demodulator demodulates the reproduced FM audio signal. The reproduced FM audio signal is supplied to a synchronous detector and synchronously detected with an output signal of the frequency demodulator. An output signal of the synchronous detector is supplied through an integrator to a drop-out discriminator which detects a drop-out generating period and provides an output indicative thereof.

25 Claims, 15 Drawing Figures

APPARATUS FOR DETECTING A DROP-OUT IN A MAGNETIC RECORDING/REPRODUCING APPARATUS

BACKGROUND OF THE INVENTION

This invention relates to an apparatus for detecting a drop-out in a magnetic recording/reproducing apparatus, in which an audio signal is recorded.

Recently, in a general type of the magnetic recording/reproducing apparatus, that is, a video tape recorder (hereinafter, VTR), the video signal is recorded on a magnetic tape as oblique record tracks by rotary heads, and the audio signal is recorded on the edge of the magnetic tape as a longitudinal track by a stationary head. In the VTR, it is desired to record the video signal for a time period which is as long as possible in the magnetic tape, especially in the consumer type VTR. In order to increase the number of recording hours, it is necessary to make the recording density high. Accordingly, it is necessary to make the track width narrow and to make the tape feeding speed slow. As a result, the tape running velocity thereof has to be much slower than the velocity of a compact cassette recorder for an audio signal, that is, about 4.5 cm/s. This slow velocity does not effect the recording/reproducing of the video signal, because the rotary velocity of the rotary heads predominates over the tape running velocity in the relative velocity of the rotary heads to the magnetic tape. However, it effects the recording/reproducing of the audio signal by the stationary head so that it is difficult to maintain the necessary quality of the reproduced audio signal, for example, a reproducing frequency characteristic and a wow and flutter characteristic.

Figure 1A:
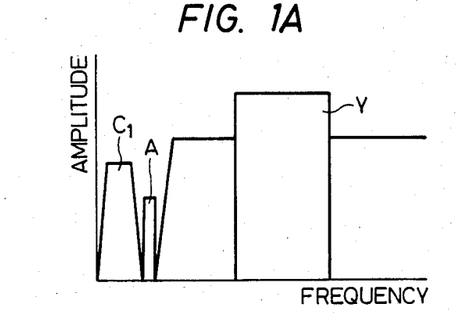
FIG. 1A and 1B represent frequency characteristics of a FM audio signal and a FM video signal recorded on a video tape.
Figure 1B:
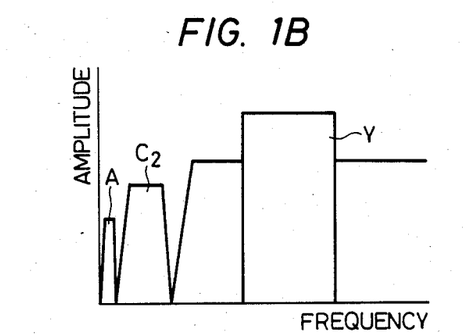

The recording of the audio signal together with the video signal has been investigated. In such a method of recording, only a small part of the broad band for the video signal is alotted to the audio signal to maintain the necessary quality mentioned above so that the high quality of the reproduced audio signal can be obtained. In one of the methods, as shown in FIGS. 1A and 1B, the audio signal (A) is frequency modulated, and the frequency modulated (hereinafter FM) audio signal is inserted between the band for an FM luminance signal (Y) and the low band for a down-converted chrominance signal (C1) (FIG. 1A), or inserted below the low band for a down-converted chrominance signal (C2) (FIG. 1B). Further, in another method in which the chrominance signal is time-multiplexed with the luminance signal, the FM audio signal is superimposed below the FM video signal. Hereinafter, these audio signal recording systems are called an FM audio superimposed system. In the FM audio superimposed system, it is necessary to cope with a drop-out. As record tracks are very narrow, defects of the magnetic tape or dust easily cause the drop-out, which raises a discontinuity of the FM signal which generates large amplitude noises, so that the quality of the reproduced audio signal becomes inferior.

Therefore, in general, in order to compensate for the drop-out, a generating period of the drop-out is detected by tracing the amplitude of the reproduced FM audio signal, and a level of the demodulated audio signal which occurs just before the generation of the drop-out is held during the generating period of the drop-out.

Figure 2:
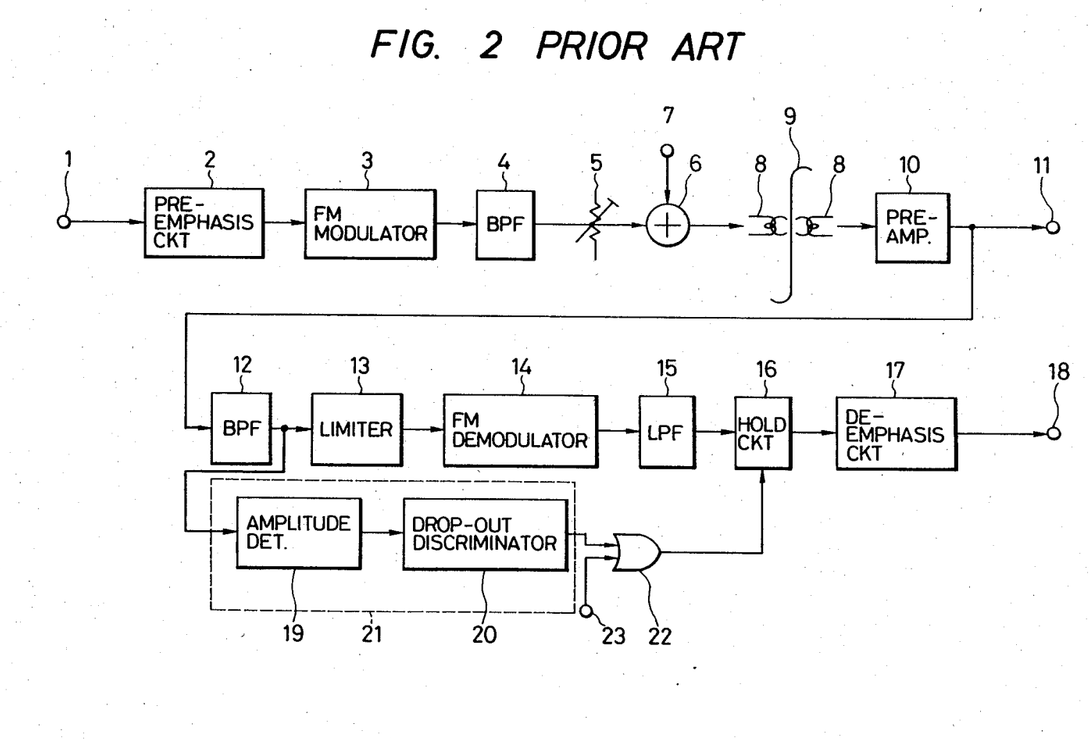
FIG. 2 is a block diagram representation of an apparatus for recording/reproducing the FM audio signal which contains a circuit for compensating a drop-out according to the prior art.

FIG. 2 shows a general block diagram of the audio signal recording/reproducing circuit in the FM audio superimposed system containing a compensating circuit for the drop-out. In FIG. 2 during a record mode, the audio signal supplied from an input terminal 1 is emphasized in a high band by a pre-emphasis circuit 2, and modulated by a frequency modulator. The FM audio signal, an unnecessary part of which is eliminated by a band pass filter (hereinafter BPF) 4, is adjusted by a level regulator 5. After that, the FM audio signal is added with the FM video signal supplied from an input terminal 7 by an adder 6 and recorded on the magnetic tape 9 by a magnetic head 8. In playback mode, the reproduced signal reproduced from the magnetic tape 9 by the magnetic head 8 is amplified by a pre-amplifier 10. One part thereof is supplied to a video signal reproducing circuit, which is not shown in FIG. 2, from an output terminal 11. Another part thereof is supplied to a BPF 12 which extracts only the FM audio signal. Some of the extracted FM audio signal is limitedly amplified by a limiter 13 with the rest thereof being detected by an amplitude detector 19.

The FM audio signal limitedly amplified by the limiter 13 is demodulated by a FM demodulator 14 and supplied to a hold circuit 16 through a low pass filter (hereinafter LPF) 15, which eliminates FM carrier components, etc. In order to compensate for the drop-out and the noise generated at the exchange point of the rotary heads, the hold circuit 16 samples the demodulated audio signal just before the noise generates and holds it during the noise generating period.

The hold circuit 16 is controlled by an output of an adder 22. The adder 22 adds an output of a drop-out detector 21 to a signal indicating the exchange points of the rotary heads supplied from an input terminal 23. The drop-out detector 21 is constructed by the amplitude detector 19 which detects an amplitude of the reproduced FM audio signal and a drop-out discriminator 20 which discriminates the drop-out generating period from the output of the amplitude detector 19. The demodulated audio signal compensated at the hold circut 16 is supplied through a de-emphasis circuit 17 to an output terminal 18 as a reproduced audio signal.

As mentioned above, the circuit shown in FIG. 2 can compensate for the noise raised by the drop-out, but has some problems, which are mainly due to the fact that the detection of the drop-out is made by directly tracing the amplitude of the reproduced FM audio signal. Namely, the drop-out is detected by discriminating whether the amplitude of the reproduced FM audio signal is large or not, but, in fact, the amplitude fluctuates due to factors as listed below, for example:

(1) A fluctuation in the recording level of the FM audio signal;
(2) a fluctuation in the reproducing level according to a fluctuation of the recording/reproducing characteristic of the magnetic heads, for example, a gap length, a track width, etc.;
(3) a fluctuation of a gain of the pre-amplifier; and
(4) a fluctuation of the characteristic of the magnetic tape.

It is, therefore, at least necessary to adjust an input level of the amplitude detector 19 or a discriminating level of the drop-out discriminator 20 to compensate for such fluctuations. Further, in consideration of the compatability of each VTR, which is the most important factor, the following fluctuation must be considered:

(5) a fluctuation in the reproducing level according to a tracking error, which cannot be cancelled by the level adjustments.

In addition to the fluctuation of the level of the reproduced FM signal, there is also a fluctuation of the noise level. As impedance noises dominate in the fluctuation of the noise level, the following fluctuations have to be mainly considered:
(1) a fluctuation of the gain of the pre-amplifier; and
(2) a fluctuation of the noise of the pre-amplifier.
The example for these fluctuation factors are listed in Table 1.

TABLE 1

|        |   | Factors        | Examples   |
|--------|---|----------------|------------|
| Signal | 1 | Recording level | ±2 dB     |
|        | 2 | Magnetic head  | ±4 dB      |
|        | 3 | Pre-amp. gain  | ±3.5 dB    |
|        | 4 | Magnetic tape  | ±2 dB      |
|        | 5 | Tracking error | ±6 dB      |
|        |   | Total (3δ)     | ±8.5 dB    |
| Noise  | 1 | Pre-amp. gain  | ±3.5 dB    |
|        | 2 | Pre-amp. noise | ±5 dB      |
|        |   | Total (3δ)     | ±6.1 dB    |

δ: a standard deviation

Apparently, from Table 1, the fluctuation of the reproduced FM signal is about ±8.5 dB, and the fluctuation of the noise level is about ±6.1 dB.

Figure 3A:
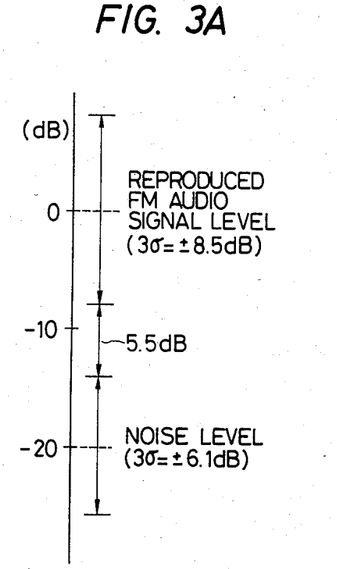
FIG. 3A and 3B illustrate signal levels of a reproduced FM audio signal and a noise concerning to the apparatus shown in FIG. 2.

Generally, in the FM audio superimposed system, in order to reduce an interruption of the FM audio signal to the FM video signal, the recording level of the FM audio signal has to be lower than the recording level of the FM video signal, for example, about −25 dB in comparison with the latter. Therefore, a S/N ratio of the reproduced FM audio signal to the noise level does not become large. Assuming that the S/N ratio is about 20 dB, the S/N ratio varies as shown in FIG. 3A due to the fluctuations described above. Therefore, at the worst case, the S/N ratio becomes about 5.5 dB.

Now, it may be considered to use an auto gain control circuit (hereinafter, AGC for removing the fluctuations of the reproduced FM audio signal. However, the use of the AGC generates a new problem. That is, since the S/N ratio cannot be made large, the fluctuation of the level of an output noise due to the AGC causes mistakes in the drop-out detection, and as the AGC becomes to have a large gain and amplifies the noise at the portion in which the FM audio signal is not recorded, it becomes impossible to detect the drop-out.

There is a type of VTR which can vary the recording density, that is, the width of the recording tracks by changing the tape running velocity. In this type of VTR, the level of the reproduced FM audio signal varies in response to the variation of the width of the recording tracks. For example, in VTR which can double the recording density by setting the tape running velocity to be half of the normal velocity, the width of the recording tracks becomes half of the normal one, so that the level of the reproduced FM audio signal goes down about 6 dB. Accordingly, the S/N ratio of the reproduced FM audio signal to the noise level, which include fluctuations of the reproduced FM audio signal and fluctuations of the noise level, is represented in FIG. 3B.

Figure 3B:
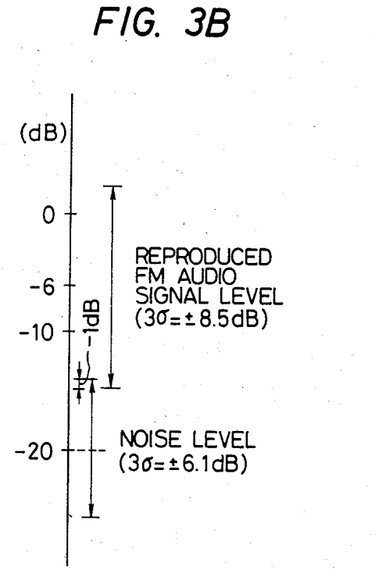

Apparently, from FIG. 3B, the S/N ratio becomes −1 dB at the worst case, so that it would be almost impossible to detect the drop-out by the method of detecting the amplitude of the reproduced FM audio signal. Further, this method cannot detect a drop-in due to the noise which jumps into the reproduced FM signal.

As described above, there are some problems in the method for detecting the drop-out or the drop-in by detecting the amplitude of the reproduced FM audio signal.

SUMMARY OF THE INVENTION

Accordingly, it is an object of the present invention to provide an apparatus which can always detect the drop-out in the FM audio superimposed system.

It is another object of the present invention to provide an apparatus which can surely detect the drop-out, the drop-in and the part in which the FM signal is not recorded without the influence of the noise level of the reproduced FM audio signal in the FM audio superimposed system.

Briefly, to attain the above mentioned objects, according to the present invention, the drop-out is detected by synchronously detecting the reproduced FM audio signal. Namely, the present invention provides an apparatus including a phase locked loop (hereinafter, PLL) type frequency demodulator which is constructed by a phase detector, a voltage controlled oscillator (hereinafter, VCO) and a loop filter, a synchronous detector which synchronously detects the reproduced FM audio signal with an output signal of VCO or a phase-shifted signal thereof, an integrator for integrating an output signal of the synchronous detector, and a drop-out detector for detecting the drop-out by using an output signal of the integrator.

DETAILED DESCRIPTION OF THE PREFERRED EMBODIMENTS

Figure 4:
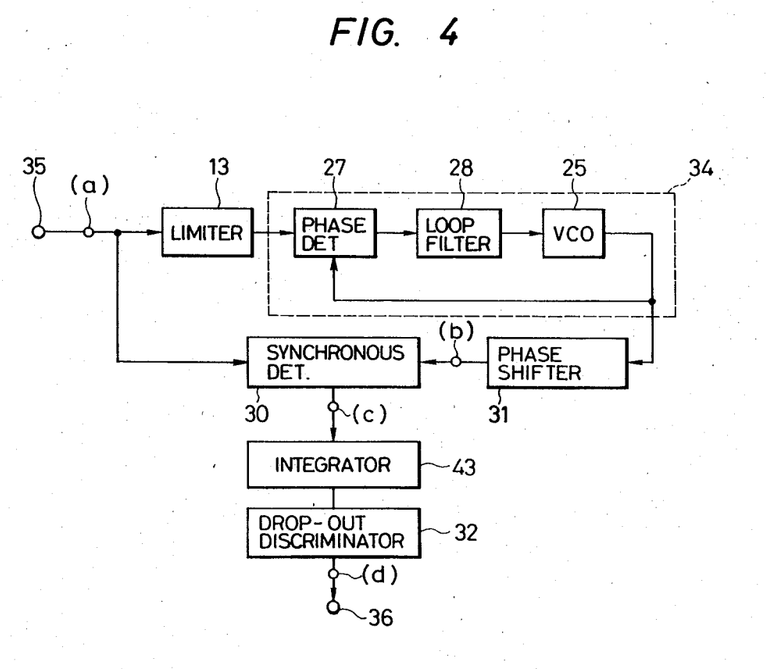
FIG. 4 is a block diagram of an apparatus for detecting the drop-out in a VTR according to an embodiment of the present invention, FIG. 5, including (a)-(f), illustrates waveforms of output signals in accordance with FIGS. 4 and 2.

FIG. 4 shows a block diagram of the apparatus for detecting the drop-out of the present invention. Referring to FIG. 4, the reproduced FM audio signal is supplied to an input terminal 35 and transmitted to a demodulating part which is constructed by a limiter 13 and a PLL type frequency demodulator 34. The PLL type frequency demodulator 34 comprises a phase detector 27, a loop filter 28 and a VCO 25. A synchronous detector 30 synchronously detects the reproduced FM audio signal with an output signal of a π/2 phase shifter 31 which phase-shifts an output signal of the VCO 25.

An output signal of the synchronous detector 30 is integrated by an integrator 43, an output signal of which is supplied to a drop-out discriminator 32. The drop-out discriminator 32 detects the drop-out and outputs a drop-out detecting signal to an output terminal 36. In this embodiment, the output signal of the VCO 25 is phase-shifted by the $\pi/2$ phase shifter 31, but it may be acceptable to phase-shift the reproduced FM audio signal instead of the output signal of the VCO 25. Further, the $\pi/2$ phase shifter 31 is used in the above case, in which the phase detector 27 is constructed by an analog circuit. However, when the phase detector 27 is constructed as a digital circuit, the phase of the output signal of the VCO 25 coincides with the phase of the input signal thereof, that is, the reproduced audio signal, so that the $\pi/2$ phase shifter is not needed.

Figure 5:
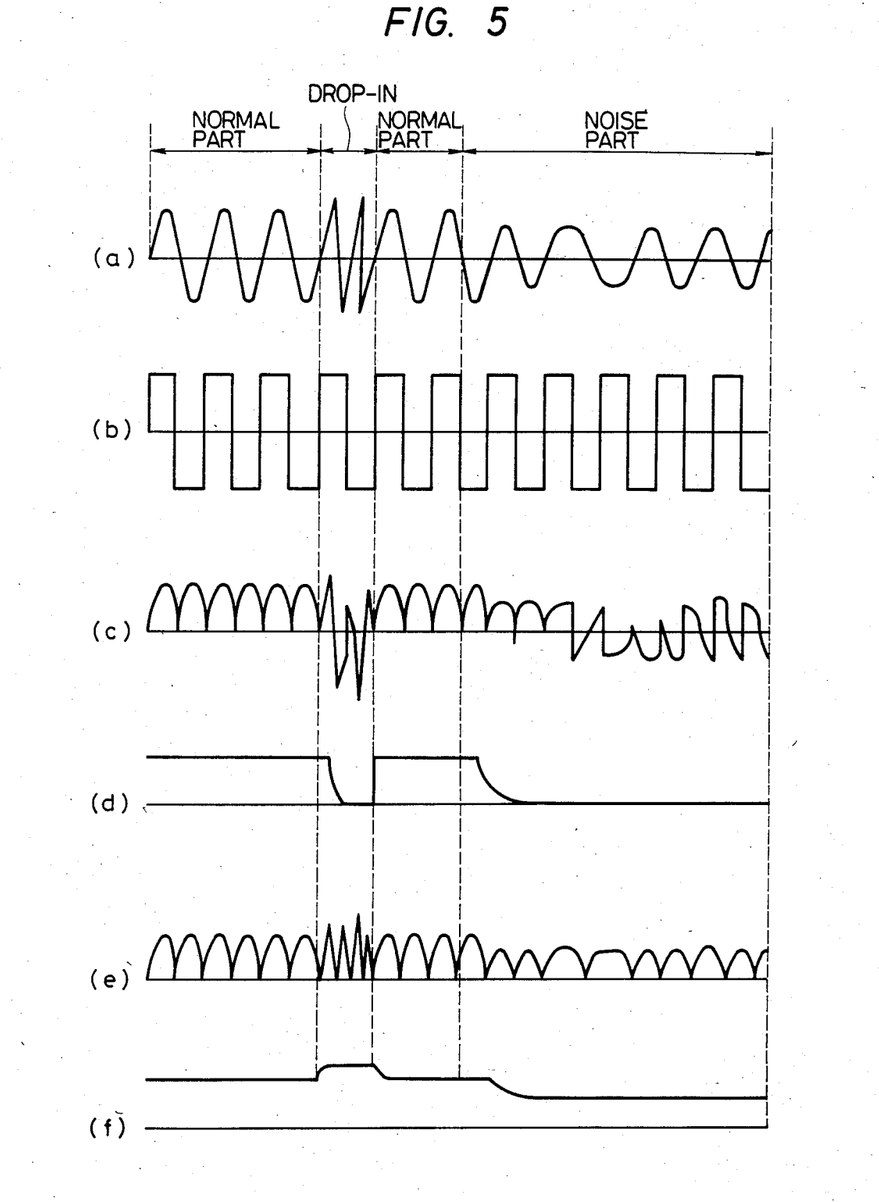

Referring to FIG. 5, waveforms (a), (b), (c) and (d) illustrate the reproduced FM audio signal, the output signal of the phase shifter 31 the output signal of the synchronous detector 30 and the output signal of the integrator 43, respectively. Waveforms (e) and (f) depict an amplitude detected signal being full-wave-rectified and an integrated signal thereof according to FIG. 2, respectively. In this embodiment, during a period in which the drop-out and the drop-in do not generate, the synchronous detector 30 multiplies the reproduced FM audio signal shown in FIG. 5(a) with the output signal of the $\pi/2$ phase shifter 31 shown in FIG. 5(b) so that the output signal is full-wave-rectified in response to the level of the reproduced FM audio signal and is the output shown in FIG. 5(c). Further, during a period which the drop-out generates, the phase of the noise shown in FIG. 5(a) becomes random in comparison with the phase of the $\pi/2$ phase shifter 31 so that the output signal of the synchronous detector 30 includes random noises as shown in FIG. 5(c). In a similar manner, during a period which the drop-in generates, the output signal of the synchronous detector 30 also includes random noises. Therefore, by integrating the output signal of the synchronous detector 30, the integrator 43 generates a DC (direct current) voltage during a normal part, but does not generate a voltage during the period in which the drop-out and the drop-in generate, so that the drop-out discriminator 32 can discriminate the drop-out or the drop-in. However, in the method of detecting the amplitude of the reproduced FM audio signal, the amplitude detected signal which is full-wave-rectified has a waveform as shown in FIG. 5(e), and after integration, the waveform during the normal part becomes the same as the waveform during the noise part so that it is very difficult to discriminate the drop-out.

It is noted that if the response speed of the PLL is high and the output signal of the VCO 25 follows the input noise, the randomness of the phase mentioned above is lost, so that it is necessary that the PLL type frequency modulator 34 does not follow the noise. Namely, it is necessary that the loop gain of the PLL be small. It is also indispensible that the PLL type frequency demodulator 34 be able to demodulate the FM signal modulated by a high level and high frequency signal. Namely, it is necessary that the loop gain of the PLL is large.

Therefore, the drop-out detecting method of this invention using the synchronous detecting method must have contradictory characteristics, that is, a large loop gain for the FM audio signal and a small loop gain for the noise. However, in general, the band of the FM audio signal is far lower than the band of the noise, so that the loop filter 28 should be made to have such a characteristic that the loop gain is small in the high band beyond the band of the FM audio signal, that is, having a lag-lead characteristic or a lag-lead-lag characteristic. Further, as the synchronous detecting method of this invention can detect the drop-out without the influence of the noise level, it becomes possible to stably detect the drop-out, even if the fluctuation of the level of the reproduced FM audio signal is removed by the AGC and the noise level raises during the noise part.

Figure 6:
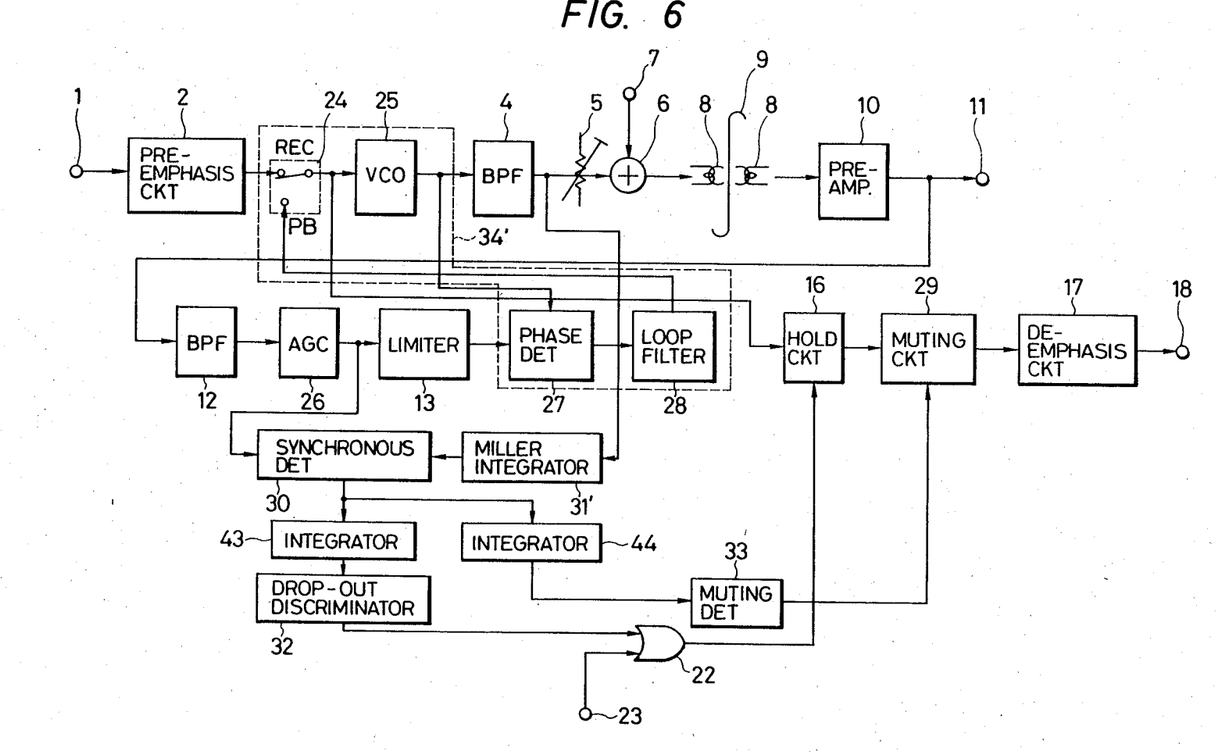
FIG. 6 is a block diagram of an apparatus for recording/reproducing the FM audio signal which includes a circuit for compensating the drop-out according to an embodiment of the present invention.

Next, the apparatus for detecting the drop-out of this invention shall be explained in more detail. In FIG. 6, the same reference numerals are used to denote the same members as those shown in FIG. 4. Referring to FIG. 6, in a record mode, the audio signal supplied to the input terminal 1 is emphasized at the high components by the pre-emphasis circuit 2, applied through a switch 24 to the VCO 25, and frequency-modulated. The FM audio signal, an unnecessary part of which is eliminated by the BPF 4, is adjusted by the level regulator 5. The adjusted FM audio signal is added to the FM video signal by the adder 6, and recorded on the magnetic tape 9 by the magnetic heads 8. In a playback mode, the reproduced signal from the magnetic tape 9 is amplified by the pre-amplifier 10, one part of which is delivered to the output terminal 11, and another part of which is supplied to the BPF 12 which extracts the reproduced FM audio signal. The reproduced FM audio signal, after the fluctuation of the reproduced level thereof is absorbed by the AGC 26, is supplied to the limiter 13 and the synchronous detector 30. The reproduced FM audio signal which is limited and amplified by the limiter 13 is demodulated by the frequency demodulator 34' which contains the switch 24. The output signal of the frequency demodulator 34' is supplied to the hold circuit 16. The hold circuit 16 compensates for the drop-out and the noise generated at the exhanging points of the rotary magnetic heads within the demodulated audio signal by holding the value just before the noise generation. As mentioned above, the synchronous detector 30 synchronously detects the reproduced FM audio signal from the AGC 26 with the phase shifted signal from a miller integrator 31' which has a function of the $\pi/2$ phase shifter 31. The drop-out discriminator 32 discriminates the drop-out by using the output signal of the integrator 43. A muting detector 33 detects the noise part, in which the FM signal is not recorded, by using the output signal of an integrator 44 which receives the output signal of the synchronous detector 30, and outputs a muting control signal.

The integration constant of the integrator 44 is set larger than the integration constant of the integrator 43 since in order to detect the drop-out instantaneously, the widths of which are several $\mu s$ to several hundred $\mu s$, the integration constant of the integrator 43 has to be small. Further, although the characteristic of the loop filter 28 is selected not to follow the noise, since it is not perfect, the output signal of the synchronous detector 30 does not become completely random. Accordingly, it is necessary to set the integration constant of the integrator 44 large, so that the muting detector 33 does not mistake the detection.

The hold circuit 16 is controlled by the adder 22, which adds the output signal of the drop-out discriminator 32 and the exchanging signal of the rotary magnetic heads 8. The audio signal, which is compensated by the hold circuit 16, is supplied to the muting circuit 29. The muting circuit 29 is controlled by the muting control signal from the muting detector 33, and compensates the audio signal by shutting the signal path at the drop-out period or the period in which the audio signal does not exist. The output signal of the muting circuit 29 is supplied through the de-emphasis circuit 17, in which the high band component of the audio signal is attenuated to the previous level.

As mentioned above, the present embodiment can absorb the fluctuation of the level of the reproduced FM audio signal and surely execute the detection of the drop-out and the muting.

Figure 7:
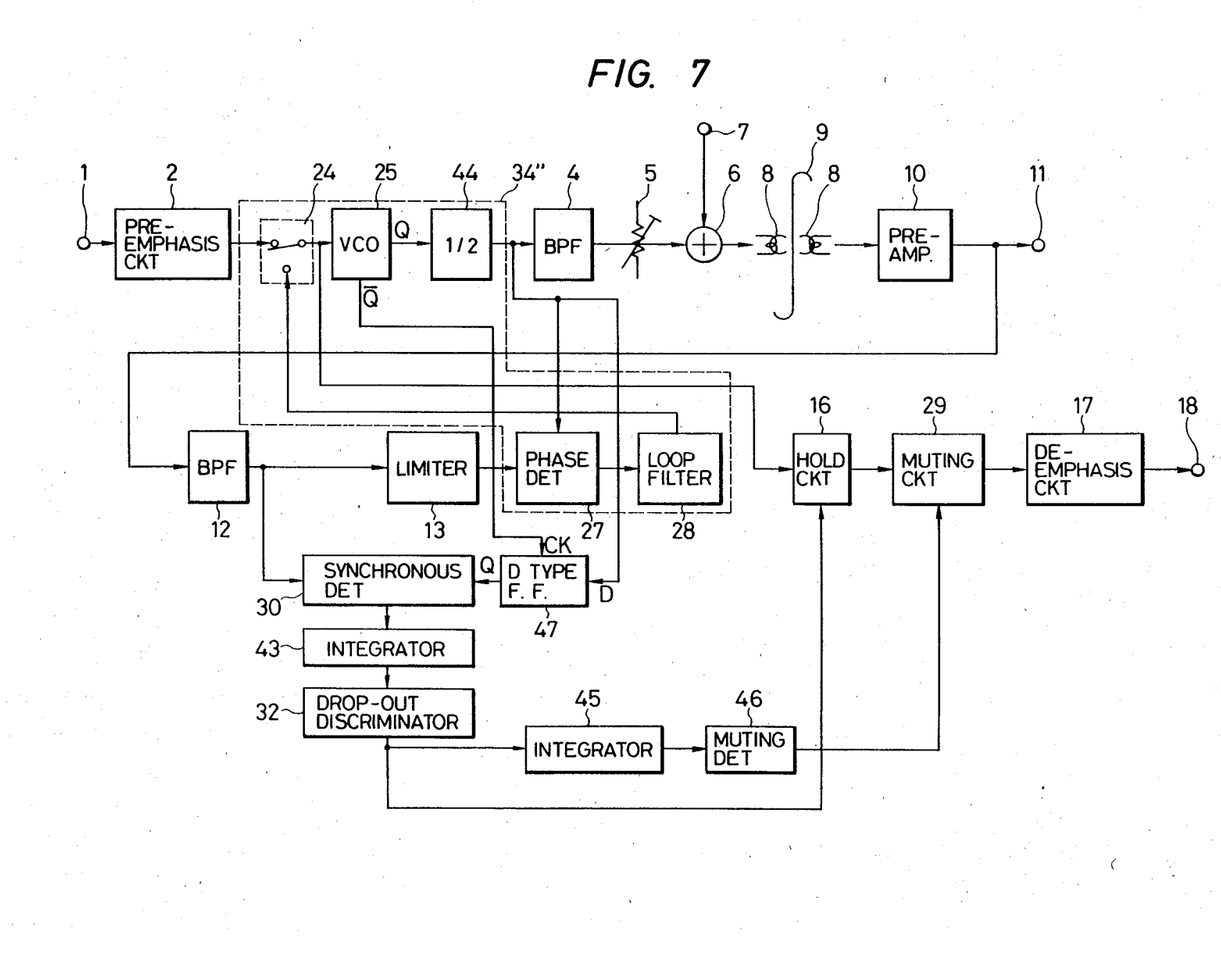
FIG. 7 is a block diagram of the apparatus according to another embodiment of the present invention.

Next, another embodiment of this invention shall be explained below. In FIG. 7, the same reference numerals are used to designate the same members as those shown in FIG. 6. In the present embodiment, an oscillating frequency of the VCO 25 is twice the FM carrier frequency, and the output signal of the VCO 25 is divided into half by a ½ divider 44 to obtain the FM audio signal. Also, the phase shifted signal is obtained from a D-type flip-flop circuit 47, to which the output signal of the divider 44 is supplied as data and an inverted output signal of the VCO 25 is supplied as a clock. Further, the muting detector 46 receives the output signal of an integrator 45 in order to detect a muting control signal. By this method, the muting is executed from the point, in which the generation number of the drop-out exceeds a predetermined level. As the remainder of the apparatus shown in FIG. 7 is the same as the apparatus as shown in FIG. 6, an explanation thereof is omitted.

Figure 8:
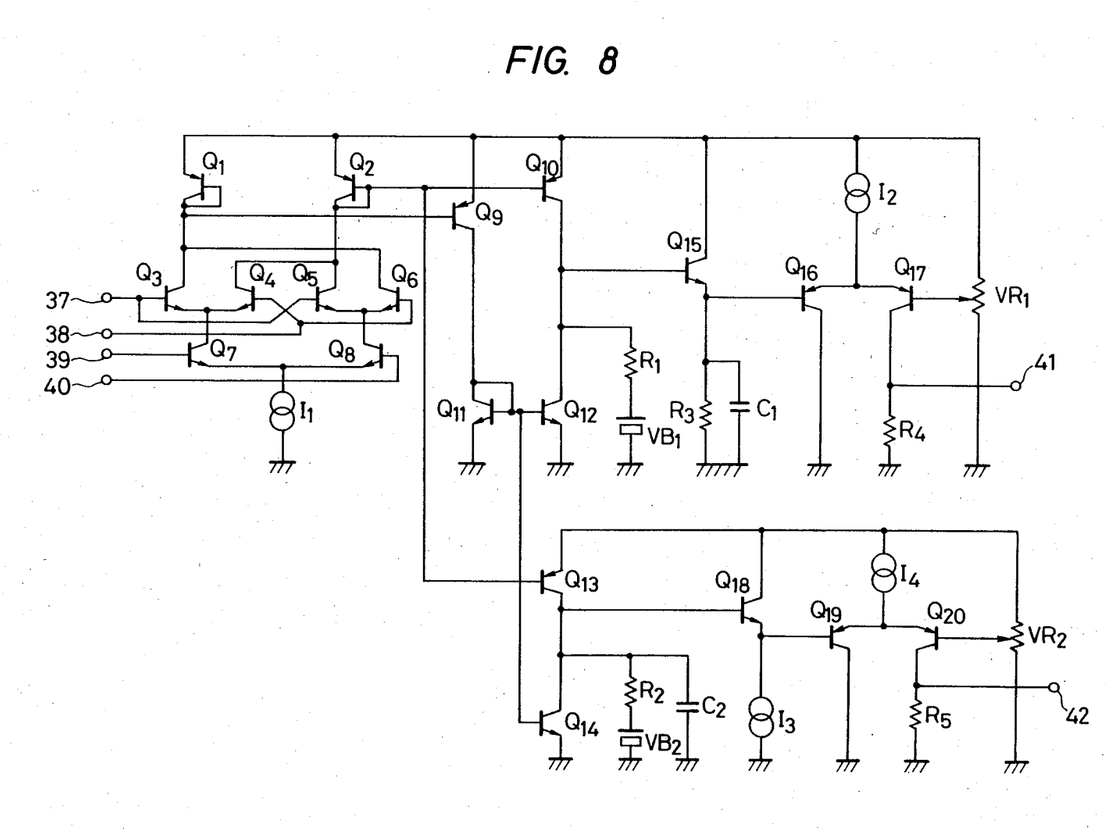
FIG. 8 is a circuit diagram of the main part shown in FIGS. 4, 6 and 7.

Next, an example of a concrete circuit construction for the main parts of FIGS. 4 and 7, that is, the synchronous detector 30, the integrators 43 and 44, the drop-out discriminator 32 and the muting detector 33, shall be explained. Referring to FIG. 8, the part constructed by the transistors Q1–Q4, a current source I1, resistors R1 and R2 and voltage sources VB1 and VB2 is the synchronous detector 30, the part constructed by transistors Q15–Q17, resistors R3 and R4, a current source I2 and a variable resistor VR1 is the drop-out discriminator 32, and the part constructed by transistors Q18–Q20, a resistor R5, a variable resistor VR2, and current sources I3 and I4 is the muting detector 33. Also, the integrators 43 and 44 are constructed by a resistor R3 and a condenser C1, a resistor R2 and a condenser C2, respectively.

In this construction, input terminals 37 and 38 of the synchronous detector 30 receive the phase shifted signal by the phase shifter 31 and input terminals 39 and 40 thereof receive the output signal of the AGC 26. Therefore, in the normal part, in which the drop-out does not generate, the same phase signals are supplied to the input terminals 37 40, so that in the case that the transistor Q7 is "ON", the transistors Q3 and Q1 become ON, and in another case that the transistor Q8 is "ON", the transistors Q1 and Q6 become "ON" so that a current of the current source I1 always flows through the transistors Q9, Q11, Q12 and Q14. Therefore, collector potentials of the transistors Q12 and Q14 always become lower than the voltages of the voltage sources VB1 and VB2 by the voltage drops of the resistors R1 and R2. On the contrary, in the noise part, in which the drop-out generates, the phase relation of the input signals supplied to the input terminals 37–40 becomes random, so that the transistors Q1 and Q2 become "ON" or "OFF" at random. Accordingly, the current of the current source I1 flows through transistors Q1 and Q2, and the collector potentials of the transistors Q12 and Q14 fluctuate at random up and down from the voltages VB1 and VB2. Therefore, the drop-out discriminator 32 determines a discriminating level by the variable resistor VR1 and supplies the output signal to an output terminal 41. Also, the muting detector 33 determines a detecting level by the variable resistor VR2 and supplies the output signal to an output terminal 42.

In the embodiments above described, the output signal of the VCO 25 is phase-shifted, but is is possible to phase-shift the reproduced FM audio signal. Further, as mentioned before, if the phase detector 27 is constructed of digital elements, it may be unnecessary to use the $\pi/2$ phase-shifter 31. Also, another circuit variation may be acceptable in the essence of the present invention, that is, the detection of the drop-out by synchronously detecting the reproduced FM audio signal with the PLL type frequency demodulator and the synchronous detector.

According to the present invention, it becomes possible to correctly discriminate the drop-out and detect the muting period without the influence of the fluctuation of the noise level, so that it becomes possible to absorb the fluctuation of the level of the reproduced FM audio signal by the AGC. Therefore, it is not necessary to adjust the VTR and there is no problem of compatibiltiy of each VTR. Further, the apparatus of this invention can also detect the noise having a large amplitude which generates at the exchanging point of the rotary magnetic heads.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. An apparatus for detecting a drop-out condition in a magnetic recording/reproducing apparatus wherein an FM audio signal is recorded on a magnetic tape and is reproduced therefrom utilizing a rotary magnetic head, the apparatus comprising:
   frequency demodulator means including a phase locked loop frequency demodulator for demodulating a reproduced FM signal and for providing an output signal indicative thereof;
   synchronous detector means for synchronously detecting the reproduced FM audio signal with the output signal of the phase locked loop frequency demodulator and for providing an output signal indicative thereof;
   integrator means for integrating an output signal of the synchronous detector means and providing an integrated output signal therefrom; and
   drop-out discriminator means responsive to the integrated output signal for detecting a drop-out and for providing an output signal indicative thereof.

2. An apparatus according to claim 1, further comprising phase shifting means for phase shifting the output signal of the phase locked loop frequency demodulator and supplying a phase shifted signal to the synchronous detector means.

3. An apparatus according to claim 2, wherein the phase shifting means provides a phase shift of $\pi/2$.

4. An apparatus according to claim 1, further comprising automatic gain control means for automatically gain-controlling the reproduced FM audio signal and for providing an automatically gain-controlled reproduced FM audio signal to the synchronous detector means.

5. An apparatus according to claim 1, wherein the phase locked loop frequency demodulator includes phase detector means for receiving the reproduced FM audio signal, loop filter means connected to the phase detector means, and voltage controlled oscillator means connected to the loop filter means, the voltage controlled oscillator means providing the output signal of the phase locked loop frequency demodulator, the synchronous detector means synchronously detecting the reproduced FM audio signal with the output signal of the voltage controlled oscillator means.

6. An apparatus according to claim 5, further comprising hold circuit means coupled to the loop filter means and the drop-out discriminator means for holding an output signal of the loop filter means in response to the output signal of the drop-out discriminator means.

7. An apparatus according to claim 6, further comprising phase shifting means for phase shifting the output signal of the phase locked loop frequency demodulator and supplying a phase shifted signal to the synchronous detector means.

8. An apparatus according to claim 7, wherein the phase shifting means provides a phase shift of $\pi/2$.

9. An apparatus according to claim 5, further comprising automatic gain control means for automatically gain-controlling the reproduce FM audio signal and for providing an automatically gain-controlled reproduced FM audio signal to the synchronous detector means.

10. An apparatus according to claim 5, wherein the integrating means includes a first integrator and a second integrator, each of the first and second integrators integrating the output signal of the synchronous detector means and providing an integrated output signal therefrom, the drop-out discriminator means being responsive to the output signal of the first integrator.

11. An apparatus according to claim 10, further comprising phase shifting means for phase shifting the output signal of the phase locked loop frequency demodulator and supplying a phase shifted signal to the synchronous detector means.

12. An apparatus according to claim 11, wherein the phase shifting means provides a phase shift of $\pi/2$.

13. An apparatus according to claim 10, further comprising automatic gain control means for automatically gain-controlling the reproduced FM audio signal and for providing an automatically gain-controlled reproduced FM audio signal to the synchronous detector means.

14. An apparatus according to claim 10, further comprising muting detector means responsive to the output signal of the second integrator for detecting a muting control signal and for providing an output signal indicative thereof, and muting circuit means coupled to the hold circuit means for muting an output signal of the hold circuit means in response to the output signal of the muting detector means.

15. An apparatus according to claim 14, further comprising phase shifting means for phase shifting the output signal of the phase locked loop frequency demodulator and supplying a phase shifted signal to the synchronous detector means.

16. An apparatus according to claim 15, wherein the phase shifting means provides a phase shift of $\pi/2$.

17. An apparatus according to claim 14, further comprising automatic gain control means for automatically gain-controlling the reproduced FM audio signal and for providing an automatically gain-controlled reproduced FM audio signal to the synchronous detector means.

18. An apparatus according to claim 14, wherein the second integrator has an integration constant which is larger than an integration constant of the first integrator.

19. An apparatus according to claim 18, further comprising phase shifting means for phase shifting the output signal of the phase locked loop frequency demodulator and supplying a phase shifted signal to the synchronous detector means.

20. An apparatus according to claim 19, wherein the phase shifting means provides a phase shift of $\pi/2$.

21. An apparatus according to claim 18, further comprising automatic gain control means for automatically gain-controlling the reproduced FM audio signal and for providing an automatically gain-controlled reproduced FM audio signal to the synchronous detector means.

22. An apparatus according to claim 5, further comprising additional integrator means for integrating the output signal of the drop-out discriminator means, muting detector means coupled to the additional integrator means for detecting a muting control signal and providing an output indicative thereof, and muting circuit means coupled to the hold circuit means for muting an output signal of the hold circuit means in response to the output signal of the muting detector means.

23. An apparatus according to claim 22, further comprising phase shifting means for phase shifting the output signal of the phase locked loop frequency demodulator means and supplying a phase shifted signal to the synchronous detector.

24. An apparatus according to claim 23, wherein the phase shifting means provides a phase shift of $\pi/2$.

25. An apparatus according to claim 22, further comprising automatic gain control means for automatically gain-controlling the reproduced FM audio signal and for providing an automatically gain-controlled reproduced FM audio signal to the synchronous detector means.

* * * * *